US012794269B2

(12) United States Patent
Patron et al.

(10) Patent No.: US 12,794,269 B2

(45) Date of Patent: Nov. 10, 2026

(54) GROUNDING A MAGNETIC STRUCTURE IN A WIRELESS POWER TRANSFER SYSTEM

(71) Applicant: Apple Inc., Cupertino, CA (US)

(72) Inventors: Damiano Patron, South San Francisco, CA (US); Brennan K Vanden Hoek, Tamarack, CA (US); Saining Ren, Auckland (NZ); Guanghua Li, San Jose, CA (US); Viswa B Pilla, San Jose, CA (US); Erin E Pierce, South Lake Tahoe, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 18/800,516

(22) Filed: Aug. 12, 2024

(65) Prior Publication Data

US 2025/0373082 A1 Dec. 4, 2025

Related U.S. Application Data

(60) Provisional application No. 63/652,594, filed on May 28, 2024.

(51) Int. Cl.
*H02J 50/12* (2016.01)
*H02J 50/70* (2016.01)

(52) U.S. Cl.
CPC .............. *H02J 50/12* (2016.02); *H02J 50/70* (2016.02)

(58) Field of Classification Search
CPC .................................. H02J 50/12; H02J 50/70
See application file for complete search history.

(56) References Cited

U.S. PATENT DOCUMENTS

| | | | | |
|---|---|---|---|---|
| 8,898,885 | B2 | 12/2014 | Singh et al. | |
| 9,300,046 | B2 | 3/2016 | Singh et al. | |
| 9,444,213 | B2 | 9/2016 | Singh et al. | |
| 10,044,229 | B2 * | 8/2018 | Partovi | H01F 27/2804 |
| 10,186,912 | B2 | 1/2019 | Stamenic et al. | |
| 11,652,511 | B2 | 5/2023 | Luzinski et al. | |
| 2012/0205137 | A1 | 8/2012 | Fjellner et al. | |
| 2014/0265620 | A1 * | 9/2014 | Hoarau | H01F 27/02 307/104 |

(Continued)

FOREIGN PATENT DOCUMENTS

| | | | | |
|---|---|---|---|---|
| CN | 220775446 U | | 4/2024 | |
| WO | WO-2009116025 A2 | * | 9/2009 | H02J 7/731 |
| WO | WO-2021061647 A1 | * | 4/2021 | H02J 7/70 |

*Primary Examiner* — Menatoallah Youssef
*Assistant Examiner* — Michael J Warmflash
(74) *Attorney, Agent, or Firm* — Treyz Law Group, P.C.; Jason Tsai; Joseph F. Guihan

(57) ABSTRACT

A wireless charging system may include a wireless power receiving device that receives wireless power from a wireless power transmitting device. The wireless power receiving device may include a printed circuit board, a magnetic structure disposed along a periphery of the printed circuit board, a wireless power transfer coil disposed on the magnetic structure and configured to receive wireless power from a power transmitting device, and a conductor electrically coupling the magnetic structure to an electrical contact on the printed circuit board for reducing electromagnetic noise produced from the wireless power transfer coil while receiving wireless power from the power transmitting device. The electrical contact can be coupled to a ground of the power receiving device.

20 Claims, 9 Drawing Sheets

(56) References Cited

U.S. PATENT DOCUMENTS

| | | | | |
|---|---|---|---|---|
| 2014/0361728 | A1* | 12/2014 | Qian | H02J 50/10 320/106 |
| 2015/0349539 | A1* | 12/2015 | Moyer | H02J 50/90 307/104 |
| 2016/0064823 | A1* | 3/2016 | Tsukuda | H01Q 7/00 343/702 |
| 2018/0090974 | A1* | 3/2018 | Elkayam | H02J 50/402 |
| 2019/0097448 | A1* | 3/2019 | Partovi | B60L 53/12 |
| 2019/0097462 | A1* | 3/2019 | Larsson | H01F 27/22 |
| 2019/0184842 | A1* | 6/2019 | Waters | B60L 53/12 |
| 2021/0057938 | A1* | 2/2021 | Russell | H01F 38/14 |
| 2023/0103141 | A1 | 3/2023 | Iacob | |
| 2023/0208210 | A1* | 6/2023 | Sultenfuss | H02J 50/005 320/109 |

* cited by examiner

GROUNDING A MAGNETIC STRUCTURE IN A WIRELESS POWER TRANSFER SYSTEM

This application claims the benefit of U.S. Provisional Patent Application No. 63/652,594, filed May 28, 2024, which is hereby incorporated by reference herein in its entirety.

FIELD

This relates generally to power systems and, more particularly, to wireless power systems for charging electronic devices.

BACKGROUND

In a wireless charging system, a power transmitting device can transmit wireless power to a power receiving device. The power receiving device charges a battery and/or powers components using the wireless power. Each one of the power receiving device and the power transmitting device includes a wireless power transfer coil. During wireless charging, a wireless power transfer coil in the power transmitting device can transmit wireless power to a corresponding wireless power transfer coil in the power receiving device. It is advantageous to direct the electromagnetic flux created by the power transmitting device to the receiving device and to reduce errant electromagnetic noise created by the system.

SUMMARY

An aspect of the disclosure provides a power receiving device that includes a printed circuit board, a magnetic structure disposed along a periphery of the printed circuit board, a wireless power transfer coil disposed on the magnetic structure and configured to receive wireless power from a power transmitting device, and a conductor electrically coupling the magnetic structure to an electrical contact on the printed circuit board and configured to reduce electromagnetic noise produced from the wireless power transfer coil while receiving wireless power from the power transmitting device. The magnetic structure can be an arcuate or circular structure formed using one or more of ferrite and nanocrystalline alloy sheets. The conductor can be a flexible circuit having a first end electrically coupled to the magnetic structure via conductive adhesive or a ferrite bead and a second end electrically coupled to the electrical contact via conductive adhesive or a ferrite bead.

An aspect of the disclosure provides a power receiving device that includes a housing, a magnetic structure, a wireless power transfer coil disposed on the magnetic structure and configured to receive wireless power from a power transmitting device, and a conductor electrically coupling the magnetic structure to a conductive portion of the housing and configured to reduce electromagnetic noise produced from the wireless power transfer coil while receiving wireless power from the power transmitting device. The conductor can be a flexible circuit having a first end electrically coupled to the magnetic structure via conductive adhesive or a ferrite bead and a second end electrically coupled to the conductive portion of the housing via conductive adhesive or a ferrite bead. The conductive portion of the housing can be a ground of the power receiving device.

An aspect of the disclosure can provide a power receiving device that includes a magnetic structure, a wireless power transfer coil disposed on the magnetic structure and configured to receive wireless power from a power transmitting device, and an electromagnetic shielding layer at least partially overlapping with the magnetic structure and having one or more contacts electrically coupled to the magnetic structure. The electromagnetic shielding layer is configured to reduce electromagnetic noise produced from the wireless power transfer coil while receiving wireless power from the power transmitting device. The electromagnetic shielding layer can include a flexible substrate and a plurality of conductive traces formed within the flexible substrate and electrically coupled to the one or more contacts. The one or more contacts can include at least two or more contacts that are evenly spaced out along a periphery of the electromagnetic shielding layer.

DETAILED DESCRIPTION

Figure 1:
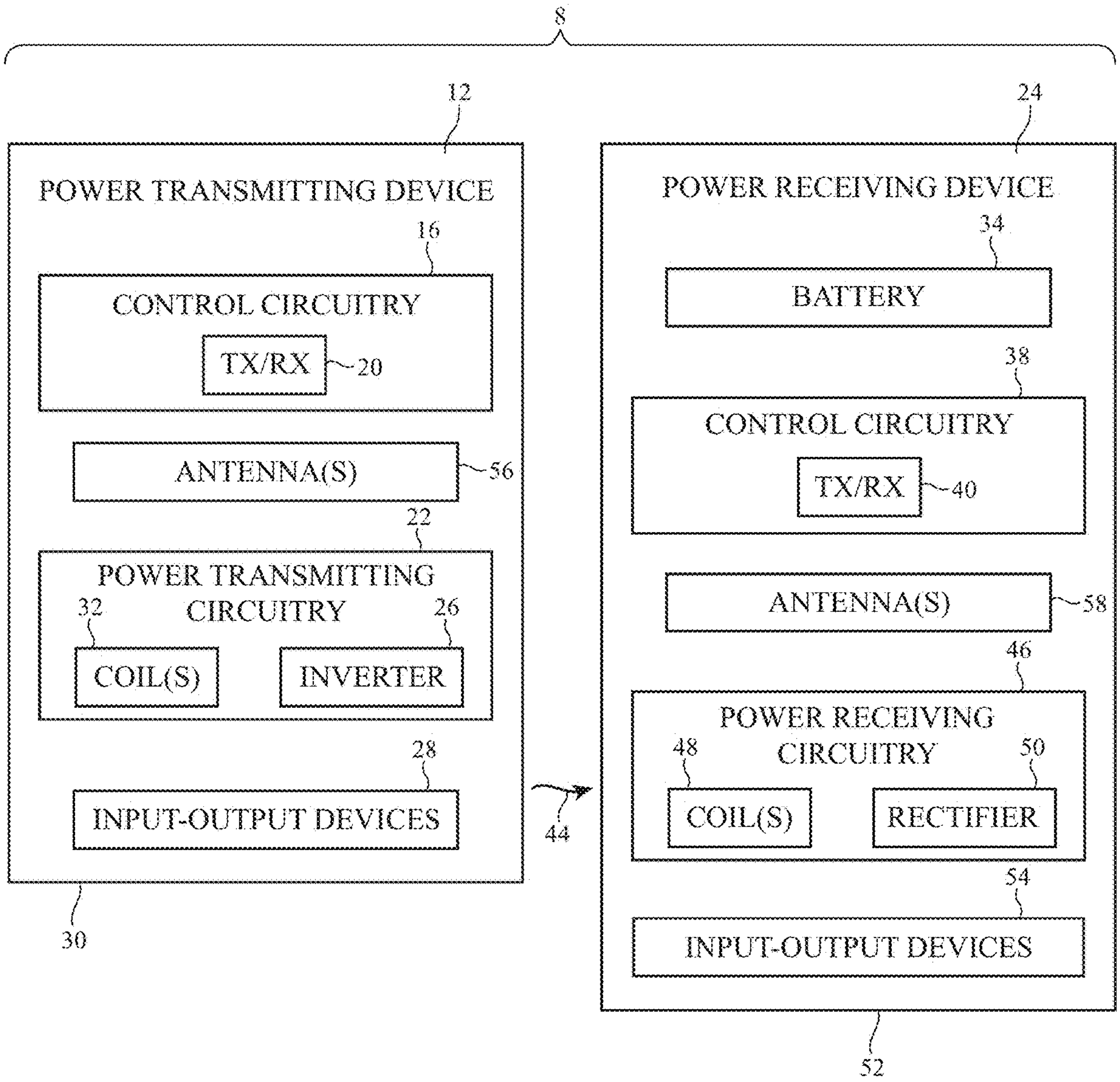
FIG. 1 is a schematic diagram of an illustrative wireless power transfer system in accordance with some embodiments.

An illustrative wireless power system (also sometimes called a wireless charging system) is shown in FIG. 1. As shown in FIG. 1, wireless power system 8 may include one or more wireless power transmitting devices such as power transmitting device 12 and one or more wireless power receiving devices such as power receiving device 24. Wireless power system 8 may sometimes also be referred to herein as wireless power transfer (WPT) system 8 or wireless power system 8. Wireless power transmitting device 12 may sometimes also be referred to herein as power transmitter (PTX) device 12 or simply as PTX 12. Wireless power receiving device 24 may sometimes be referred to herein as power receiver (PRX) device 24 or simply as PRX 24.

PTX device 12 includes control circuitry 16. Control circuitry 16 can be mounted within device housing 30. PRX device 24 includes control circuitry 38 mounted within a corresponding device housing 52 for PRX device 24. Each one of housing 30 and housing 52 may be formed from plastic, metal, fiber-composite materials such as carbon-fiber materials, wood and other natural materials, glass, other materials, and/or combinations of two or more of these materials.

Exemplary control circuitry 16 and control circuitry 38 can be used in controlling the operation of WPT system 8. This control circuitry may include processing circuitry that includes one or more processors such as microprocessors, power management units, baseband processors, digital signal processors, microcontrollers, graphics processing units (GPUs), central processing units (CPUs), application processors (APs), application-specific integrated circuits with processing circuits, and/or other processing circuits. The processing circuitry implements desired control and communications features in PTX device 12 and PRX device 24. For example, the processing circuitry may be used in controlling power to one or more coils, determining and/or setting power transmission levels, generating and/or processing sensor data (e.g., to detect foreign objects and/or external electromagnetic signals or fields), processing user input, handling negotiations between PTX device 12 and PRX device 24, sending and receiving in-band and out-of-band data, making measurements, and/or otherwise controlling the operation of WPT system 8.

Control circuitry in WPT system 8 (e.g., control circuitry 16 and/or 38) is configured to perform operations in WPT system 8 using hardware (e.g., dedicated hardware or circuitry), firmware and/or software. Software code for performing operations in WPT system 8 is stored on non-transitory computer readable storage media (e.g., tangible computer readable storage media) in the control circuitry of WPT system 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 38.

PTX device 12 may be a stand-alone power adapter (e.g., a wireless charging mat or charging puck that includes power adapter circuitry), may be a wireless charging mat or puck that is connected to a separate power adapter or other equipment by a cable, may be an electronic device (e.g., a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, a wireless internet-connected voice-controlled speaker, a home entertainment device, a remote control device, a gaming controller, a peripheral user input device, a wireless base station or access point, equipment that implements the functionality of two or more of these devices, or other electronic equipment), may be equipment that has been incorporated into furniture, a vehicle, or other system, may be a removable battery case, or may be other wireless power transfer equipment.

PRX device 24 may be an electronic device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a wireless tracking tag, a television, a computer display that does not contain an embedded computer, a gaming device, a navigation device, a wireless internet-connected voice-controlled speaker, a home entertainment device, a remote control device, a gaming controller, a peripheral user input device, a wireless base station or access point, equipment that implements the functionality of two or more of these devices, or other electronic equipment.

PTX device 12 may be connected to a wall outlet (e.g., an alternating current power source), may be coupled to a wall outlet via an external power adapter, may have a battery for supplying power, and/or may have another source of power. In implementations where PTX device 12 is coupled to a wall outlet via an external power adapter, the adapter may have an alternating-current (AC) to direct-current (DC) power converter that converts AC power from a wall outlet or other power source into DC power. If desired, PTX device 12 may include a DC-DC power converter for converting the DC power between different DC voltages. Additionally or alternatively, PTX device 12 may include an AC-DC power converter that generates the DC power from the AC power provided by the wall outlet (e.g., in implementations where PTX device 12 is connected to the wall outlet without an external power adapter). DC power may be used to power control circuitry 16. During operation, a controller in control circuitry 16 uses power transmitting circuitry 22 to transmit wireless power to power receiving circuitry 46 of PRX device 24.

Power transmitting circuitry 22 may have switching circuitry, such as inverter circuitry 26 formed from transistors, that are turned on and off based on control signals provided by control circuitry 16 to create AC current signals through one or more wireless power transmitting coils such as wireless power transmitting coil(s) 32. These coil drive signals cause coil(s) 32 to transmit wireless power. In implementations where coil(s) 32 include multiple coils, the coils may be disposed on a magnetic structure, arranged in a planar coil array, or may be arranged to form a cluster of coils (e.g., two or more coils, 5-10 coils, at least 10 coils, 10-30 coils, fewer than 35 coils, fewer than 25 coils, or other suitable number of coils). In some implementations, PTX device 12 includes only a single coil 32.

As the AC currents pass through one or more coils 32, alternating-current electromagnetic (e.g., magnetic) fields (wireless power signals 44) are produced that are received by one or more corresponding receiver coils such as coil(s) 48 in PRX device 24. In other words, one or more of coils 32 can be inductively coupled to one or more of coils 48. PRX device 24 may have a single coil 48, at least two coils 48, at least three coils 48, at least four coils 48, or another suitable number of coils 48.

When the alternating-current electromagnetic fields are received by coil(s) 48, corresponding alternating-current currents are induced in coil(s) 48. The AC signals that are used in transmitting wireless power may have any desired frequency (e.g., 100-400 kHz, 1-100 MHz, between 1.7 MHz and 1.8 MHz, less than 2 MHz, between 100 kHz and 2 MHz, etc.). Rectifier circuitry such as rectifier circuitry 50, which contains rectifying components such as synchronous rectification transistors arranged in a bridge network, converts received AC signals (received alternating-current signals associated with wireless power signals 44) from one or more coils 48 into DC voltage signals for powering PRX device 24. Wireless power signals 44 are sometimes referred to herein as wireless power 44 or wireless charging signals 44. Coils 32 are sometimes referred to herein as wireless power transfer coils 32, wireless charging coils 32, or wireless power transmitting coils 32. Coils 48 are sometimes referred to herein as wireless power transfer coils 48, wireless charging coils 48, or wireless power receiving coils 48.

The DC voltage produced by rectifier circuitry 50 (sometime referred to as rectifier output voltage Vrect) may be used in charging a battery such as battery 34 and may be used in powering other components in PRX device 24 such as control circuitry 38, input-output (I/O) devices 54, etc. PTX device 12 may also include input-output devices such as input-output devices 28. Input-output devices 54 and/or input-output devices 28 may include input devices for gathering user input and/or making environmental measurements and may include output devices for providing a user with output.

As examples, input-output devices 28 and/or input-output devices 54 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 28 and/or input-output devices 54 may also include sensors for gathering input from a user and/or for making measurements of the surroundings of WPT system 8.

The example in FIG. 1 of PRX device 24 including battery 34 is illustrative. More generally, an electronic device may include a power storage device 34. Power storage device 34 may be a battery, or may be, for example, a supercapacitor configured to store charge.

PTX device 12 and PRX device 24 may communicate wirelessly using in-band or out-of-band communications. Implementations using in-band communication may utilize, for example, frequency-shift keying (FSK) and/or amplitude-shift keying (ASK) techniques to communicate in-band data between PTX device 12 and PRX device 24. Wireless power and in-band data transmissions may be conveyed using coils 32 and 48 concurrently. When PTX 12 sends in-band data to PRX 24, wireless transceiver (TX/RX) circuitry 20 may modulate wireless charging signal 44 to impart FSK or ASK communications, and wireless transceiver circuitry 40 may demodulate the wireless charging signal 44 to obtain the data that is being communicated. When PRX 24 sends in-band data to PTX 12, wireless transceiver (TX/RX) circuitry 40 may modulate wireless charging signal 44 to impart FSK or ASK communications, and wireless transceiver circuitry 20 may demodulate the wireless charging signal 44 to obtain the data that is being communicated.

Implementations using out-of-band communication may utilize, for example, hardware antenna structures and communication protocols such as Bluetooth or NFC to communicate out-of-band data between PTX device 12 and PRX device 24. Power may be conveyed wirelessly between coils 32 and 48 concurrently with the out-of-band data transmissions. Wireless transceiver circuitry 20 may wirelessly transmit and/or receive out-of-band signals to and/or from PRX device 24 using an antenna such as antenna 56. Wireless transceiver circuitry 40 may wirelessly transmit and/or receive out-of-band signals to and/or from PTX device 12 using an antenna such as antenna 58.

The example in FIG. 1 of PTX 12 transmitting wireless power and PRX 24 receiving wireless power is merely illustrative. PTX 12 may optionally be capable of receiving wireless power signals using coil(s) 32 and PRX 24 may optionally be capable of transmitting wireless power signals using coil(s) 48. When a device is capable of both transmitting and receiving wireless power signals, the device may include both an inverter and a rectifier.

Figure 2:
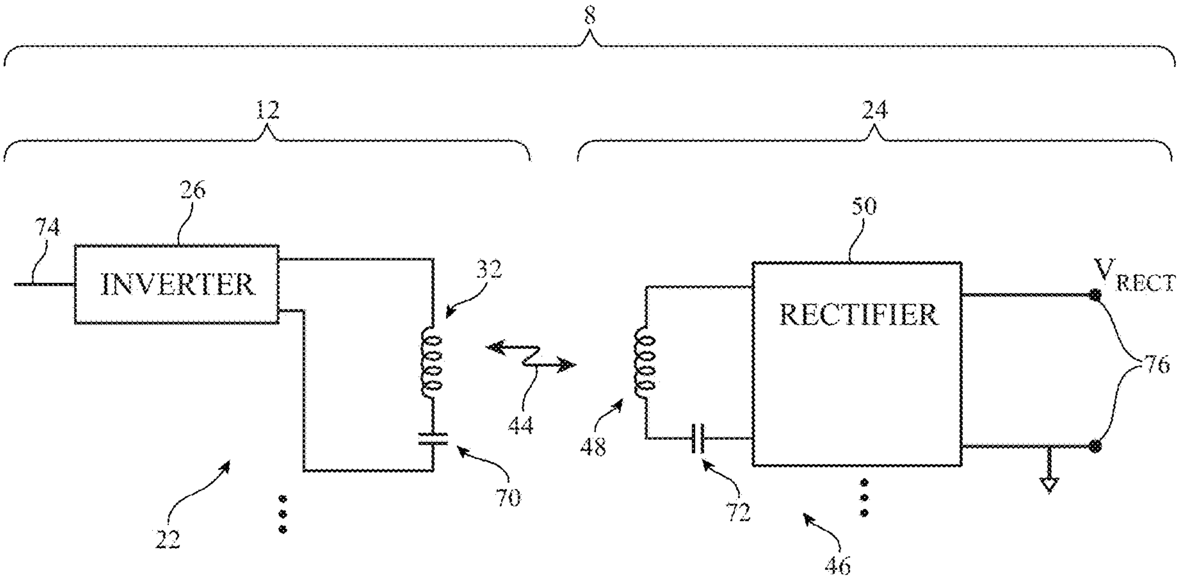
FIG. 2 is a circuit diagram of wireless power transmitting and receiving circuitry in accordance with some embodiments.

FIG. 2 is a circuit diagram of illustrative wireless power transfer circuitry for system 8. As shown in FIG. 2, power transmitting circuitry 22 may include inverter circuitry such as one or more inverters 26 or other drive circuitry that produces wireless power signals that are transmitted through an output circuit that includes one or more coils 32 and capacitors such as capacitor 70. In some embodiments, power transmitting device 12 may include multiple individually controlled inverters 26, each of which supplies drive signals to a respective coil 32. In other embodiments, an inverter 26 is shared between multiple coils 32 using switching circuitry.

During operation, control signals for inverter(s) 26 are provided by control circuitry 16 at control input 74. A single inverter 26 and single coil 32 is shown in the example of FIG. 2, but multiple inverters 26 and multiple coils 32 may be used, if desired. In a multiple coil configuration, switching circuitry (e.g., multiplexer circuitry) may be used to couple a single inverter 26 to multiple coils 32 and/or each coil 32 may be coupled to a respective inverter 26. During wireless power transmission operations, transistors in one or more selected inverters 26 can be driven by AC control signals from control circuitry 16. The relative phase between the inverters may be adjusted dynamically (e.g., a pair of inverters 26 may produce output signals in phase or out of phase).

The application of drive signals using inverter(s) 26 (e.g., transistors or other switches in circuitry 22) causes the output circuits formed from selected coils 32 and capacitors 70 to produce alternating-current (AC) electromagnetic fields (signals 44) that are received by wireless power receiving circuitry 46 using a wireless power receiving circuit formed from one or more coils 48 and one or more capacitors 72 in device 24.

Rectifier circuitry 50, sometimes referred to as a rectifier, is coupled to one or more coils 48 and converts received power from AC to DC and supplies a corresponding direct current (DC) output voltage Vrect across rectifier output terminals 76 for powering load circuitry in device 24 (e.g., for charging battery 34, for powering a display and/or other input-output devices 54, and/or for powering other components).

Figure 3:
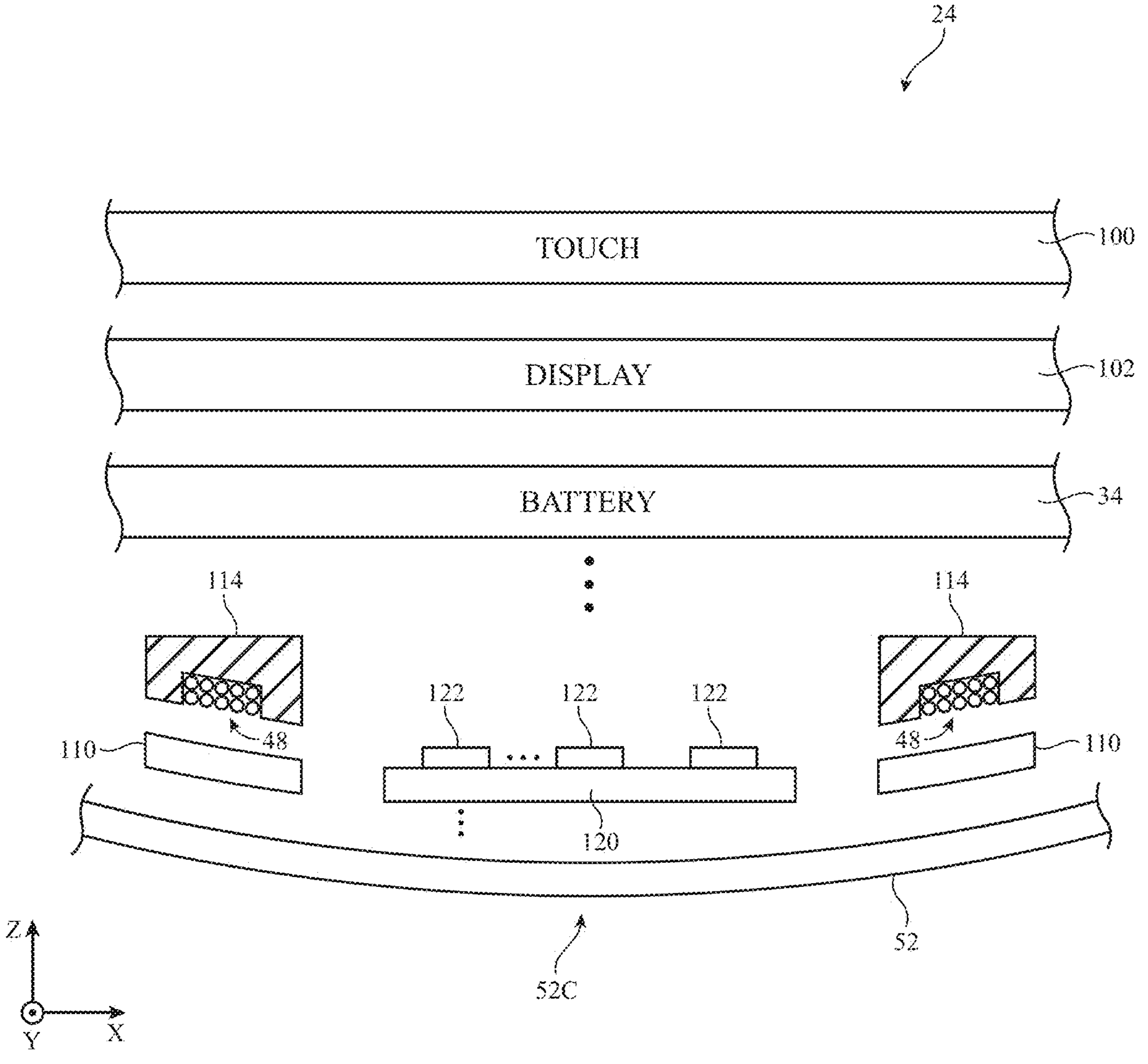
FIG. 3 is a side view of an illustrative power receiving device having a wireless power transfer coil disposed on a magnetic core in accordance with some embodiments.

FIG. 3 is a side view of an illustrative power receiving device (PRX) 24. As shown in FIG. 3, device 24 may include a wireless power transfer coil 48 disposed within a device housing (see housing 30 in FIG. 1). The housing of device 24 can include one or more housing structures (e.g., formed from plastic, polymer, metal, glass, sapphire, ceramic, and/or other desired materials). The housing may include a housing portion 52 having a surface 52C with a concave curvature, sometimes referred to as concave surface 52C (as an example). If desired, housing portion 52 can alternatively have a planar surface.

Coil 48 may be disposed on magnetic core 114. Magnetic core 114 may be formed from a soft magnetic material such as ferrite. The magnetic core may have a high magnetic permeability, allowing it to guide the magnetic fields in the system. The example of using ferrite cores is merely illustrative. Other magnetic materials such as iron, mild steel, mu-metal (a nickel-iron alloy), a nanocrystalline magnetic material, rare earth metals, or other magnetic materials having a sufficiently high magnetic permeability to guide magnetic fields in the system may be used for one or more of the cores if desired. Magnetic core 114 may be a single piece of magnetic material or made from separate pieces of magnetic material. Magnetic core 114 may be molded, sintered, formed from laminations (e.g., to form nanocrystalline alloy sheets), formed from particles (e.g., ceramic particles) distributed in a polymer, and/or manufactured by other processes. Magnetic core 114 can be formed using one or more of ferrite and nanocrystalline alloy sheets.

Wireless power transfer coil 48 may be a circular structure when viewed from atop in the direction of the XY plane. Magnetic core 114 on which wireless power transfer coil 48 is disposed may also be a circular (arcuate) structure. Arcuate magnetic core 114 may at least partially surround a central region in which a substrate layer such as a printed circuit board (PCB) 120 is disposed (e.g., printed circuit board 120 may be at least partially surrounded by magnetic core 114). Magnetic core 114 can thus be disposed along a periphery of printed circuit board 120. One or more circuit components such as circuit components 122 can be formed on a surface of circuit board 120. The example of FIG. 3 in which circuit components 122 are formed on an upper surface of circuit board 120 is illustrative. Additional or alternatively, one or more circuit components can be mounted on a lower surface, opposing the upper surface, of circuit board 120.

In some embodiments, components 122 can include one or more sensors in input-output devices 54 of FIG. 1. Sensors 122 may include optical sensors such as one or more optical transmitters and one or more optical receivers. The optical transmitters may transmit optical signals (e.g., visible light, infrared light, etc.) through one or more optically transparent windows of housing portion 52. The optical receivers may receive optical signals through the one or more optically transparent windows or portions of housing portion 52. The optical sensors may, for example, be used to measure a user's heart rate or blood oxygen level when the user is wearing device 10 on their body. If desired, sensors 122 may include electrocardiogram (ECG or EKG) electrodes. Sensors 122 may sense the electrical activity of a user's heart using the sensor electrodes while the user wears device 10, for example. Sensors 122 may also include one or more sensors such as a light sensor, proximity sensor, touch sensor, or other sensors. Circuit board 120 is thus sometimes referred to as a sensor board.

In some embodiments, components 122 can include one or more antenna elements (e.g., elements that form part of one or more antennas within device 24. Device 24 can include one or more antennas 58 (FIG. 1) and may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, cavity-backed antennas, dielectric resonator structures, hybrids of these designs, etc. Two or more antennas may be arranged in a phased antenna array if desired (e.g., for conveying centimeter and/or millimeter wave signals within a signal beam formed in a desired beam pointing direction that may be steered/adjusted over time).

The one or more antennas 58 can be configured to convey signals in various frequency ranges. As examples, the one or more antennas 58 can convey signals in wireless local area network (WLAN) frequency bands (e.g., Wi-Fi® (IEEE 802.11) or other WLAN communications bands) such as a 2.4 GHz WLAN band (e.g., from 2400 to 2480 MHZ), a 5 GHZ WLAN band (e.g., from 5180 to 5825 MHZ), a Wi-Fi® 6E band (e.g., from 5925-7125 MHZ), and/or other Wi-Fi® bands (e.g., from 1875-5160 MHZ), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802. XX family of standards, and/or any other desired frequency bands of interest. Signals that are conveyed in the cellular frequency bands can be referred to as cellular signals. Signals that are conveyed in the Wi-Fi bands can be referred to as Wi-Fi signals. An antenna configured to transmit and/or receive cellular signals can be referred to as a cellular antenna. An antenna configured to transmit and/or receive Wi-Fi signals can be referred to as a Wi-Fi antenna. If desired, a single antenna can be configured to transmit and/or receive signals in one or more frequency bands or using different radio access technologies.

FIG. 3 further illustrates how device 24 can include touch circuitry 100, display circuitry 102, battery 34, and/or other electronic components within the housing of device 24. The touch circuitry 100 may include a layer of conductive capacitive touch sensor electrodes or other touch sensor components (e.g., resistive touch sensor components, acoustic touch sensor components, force-based touch sensor components, light-based touch sensor components, etc.), etc. Display circuitry 102 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies.

Touch circuitry 100 may be incorporated as part of display circuitry 102 to form a touchscreen display. This touchscreen display may also be force sensitive and may gather force input data associated with how strongly a user or object is pressing against the display. The touchscreen display may be protected using a display cover layer. The display cover layer may be formed from a transparent material such as glass, plastic, sapphire or other crystalline dielectric materials, ceramic, or other clear materials. The display cover layer may extend across substantially all of the length and width of device 24, for example. Although not explicitly shown, additional components such as communications, storage, and processing components can be included within the stack-up of device 24. The arrangements of components within device 24 may vary.

The electronic components within device 24 may be subject to signal interference or noise. In accordance with an embodiment, device 24 can include a shielding layer such as shielding layer 110 that overlaps with wireless power transfer coil 48. In the example of FIG. 3, shielding layer 110 can be disposed directly under coil 48 in the orientation of FIG. 3. In other embodiments, shielding layer 110 might be disposed directly above coil 48. As an example, shielding layer 110 can be a metal shield. As another example, shielding layer 110 can be a flexible (flex) circuit that includes one or more conductive traces formed within a flexible substrate. Device configurations in which shielding layer 110 is implemented as a flex circuit are sometimes described herein as an example. Shielding layer 110 is thus sometimes referred to as shielding flex circuit 110 or flex shielding layer 110. Shielding layer 110 can be configured to suppress electromagnetic interference. Shielding layer 110 can be configured to shield electric field between coil 48 and other components such as touch circuitry 100, display circuitry 102, components 122 on board 120, and/or other electronic components within device 24. Shielding layer 110 is thus sometimes referred to as an electromagnetic shield or e-shield. Shielding layer 110 can optionally include signal pads and traces that are electrically coupled to one or more components 122 on circuit board 120.

Figure 4:
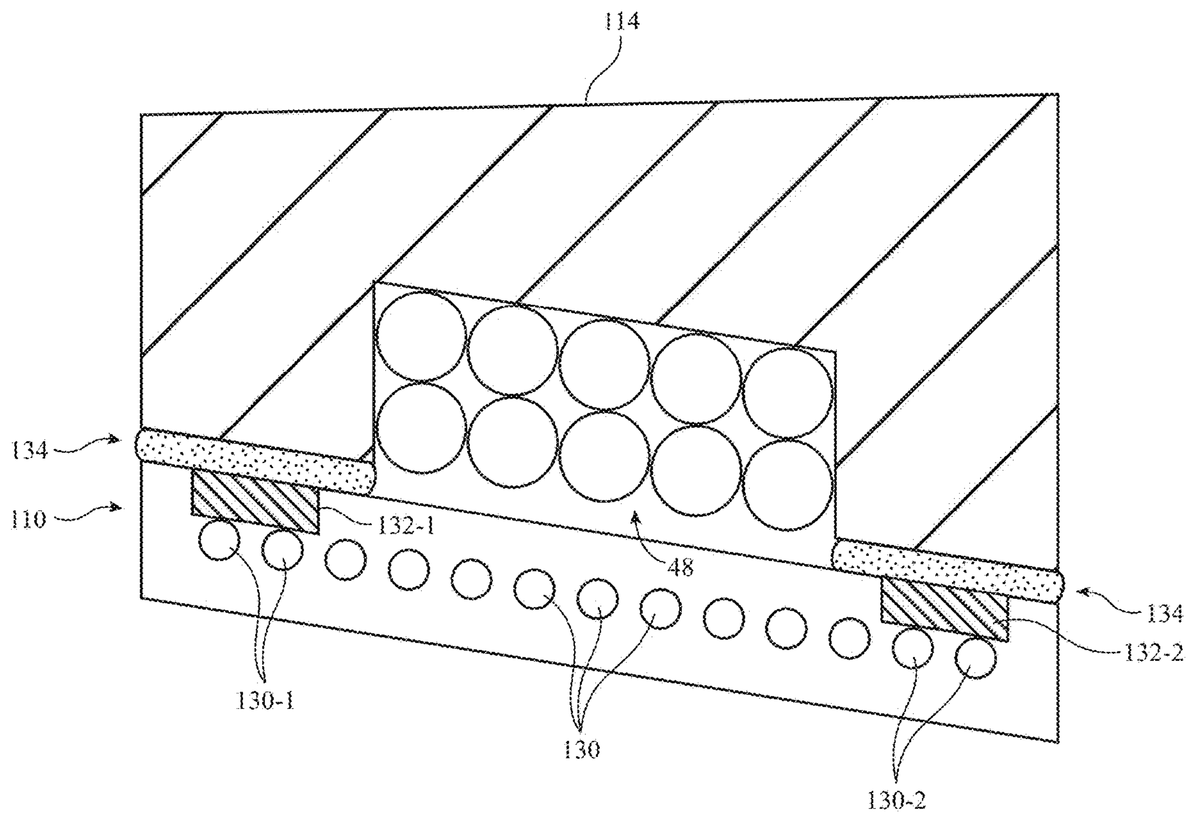
FIG. 4 is a side view showing a magnetic core being coupled to a contact of an illustrative electromagnetic shielding layer via conductive adhesive material in accordance with some embodiments.

During wireless power transfer, magnetic core 114 helps direct magnetic flux that is generated by a coupled wireless power transmitter towards coil 48. However, some of the magnetic flux can contribute to an amount of electromagnetic noise during wireless power transfer operations. In accordance with some embodiments, magnetic core 114 can be electrically coupled to a contact on the flex shielding layer 110. FIG. 4 is a side view showing magnetic core 114 being electrically coupled to a contact of shielding layer 110. As shown in FIG. 4, shielding layer 110 may be a flex circuit having a plurality of conductive traces 130 formed in a dielectric substrate. Conductive traces 130 can be formed from copper, nickel, silver, gold, other metals, conductive polymers, a combination of these materials, or other suitable conductive material. Conductive traces 130 can include ground traces (e.g., traces that are electrically coupled to a ground power supply voltage or a ground of device 24), power supply traces (e.g., traces that are electrically couped to a positive power supply voltage or other power supply voltage different than the ground power supply voltage of device 24), signal traces, and/or other types of voltage conducting traces.

At least some of the conductive traces 130 can be electrically coupled to one or more contacts 132 of shielding layer 110. In the example of FIG. 4, a portion of the conductive traces such as traces 130-1 can be electrically coupled to a first contact 132-1, whereas another portion of the conducive traces such as traces 130-2 can be electrically coupled to a second contact 132-2. For example, traces 130-1 and 130-2 can be ground traces, so contacts 132-1 and 132-2 being coupled to these traces can be ground contacts (e.g., contacts being coupled to a ground of power receiving device 24). Ground contacts 132-1 and 132-2 can be formed at an external surface of shielding layer 110 and can thus sometimes be referred to as "exposed" ground contacts or ground pads. In general, the exposed contacts 132-1 and 132-2 can be ground contacts or power supply contacts (e.g., exposed pads configured to receive a ground power supply voltage, a positive power supply voltage, or other static voltage via one or more conductive traces 130).

In the example of FIG. 4, magnetic core 114 may be electrically coupled to contacts 132-1 and 132-2 via conductive material 134. Conductive material 134 can be conductive adhesive (e.g., conductive pressure sensitive adhesive material), conductive foam, or other conductive material. Electrically coupling magnetic core 114 to one or more exposed ground contacts 132 on shielding layer 110 is sometimes referred to as "grounding" the magnetic core 114. Grounding magnetic core 114 in this way can be technically advantageous and beneficial to provide a low impedance path for common mode electromagnetic interference and noise signals produced by magnetic core 114 and/or coil 48, thus reducing undesired electromagnetic emission produced by device 24 during wireless power transfer operations.

Figure 5:
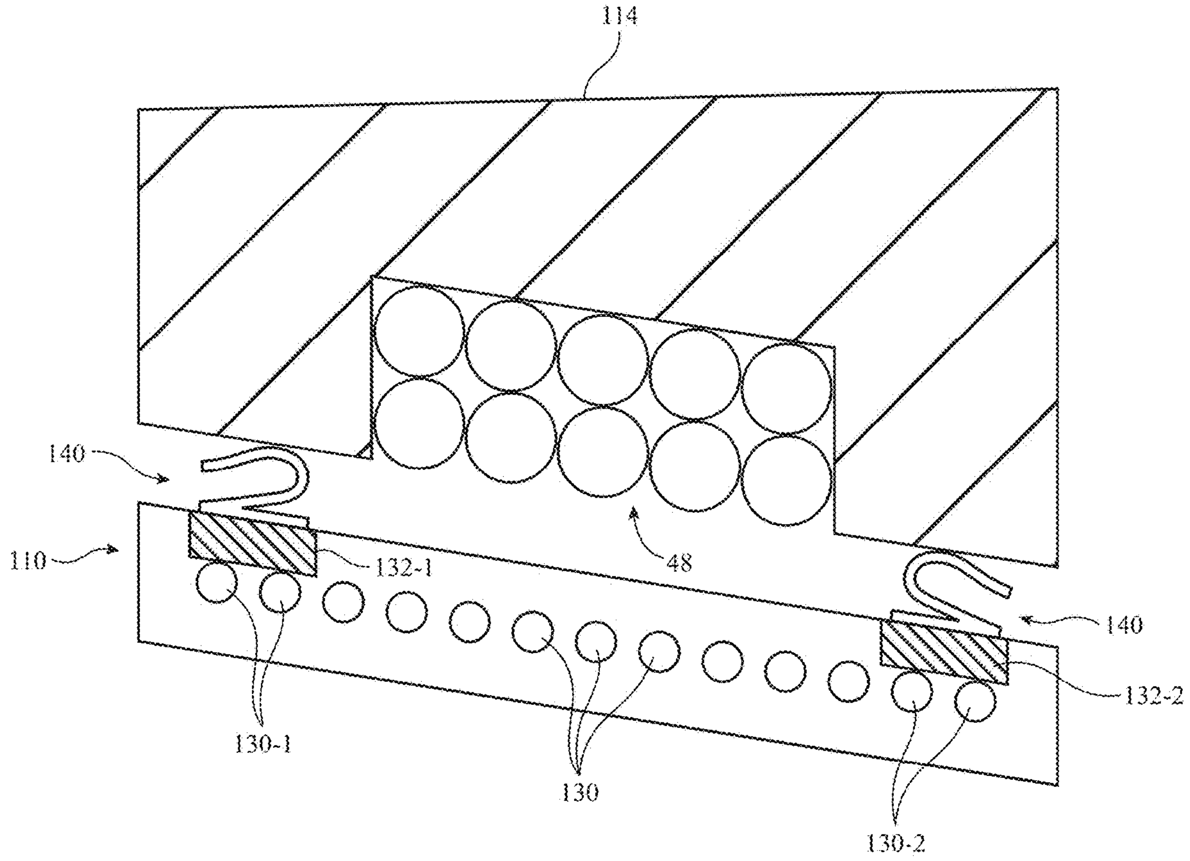
FIG. 5 is a side view showing a magnetic core being coupled to a contact of an illustrative electromagnetic shielding layer via conductive springs in accordance with some embodiments.

The example of FIG. 4 in which magnetic core 114 is electrically coupled to contacts 132 is illustrative. As another example, magnetic core 114 can be electrically coupled to contacts 132 via conductive tape. As another example, magnetic core 114 can be electrically coupled to contacts 132 via mechanical pressure (e.g., magnetic core 114 may be pressed or biased against a surface of contacts 132 without any adhesive material). FIG. 5 illustrates another example in which magnetic core 144 is electrically coupled to contacts 132 via one or more spring structures 140. Spring structures 140 can be conductive spring structures formed from copper, nickel, silver, gold, other metals, conductive polymers, a combination of these materials, or other suitable conductive material. The use of conductive springs 140 can help provide mechanical compliance. For example, springs 140 can compress more in certain scenarios or can compress less in other scenarios. This ability of springs 140 to deform or change shape in response to an applied force provides improved tolerance when attaching magnetic core 114 to shielding layer 110.

Figure 6:
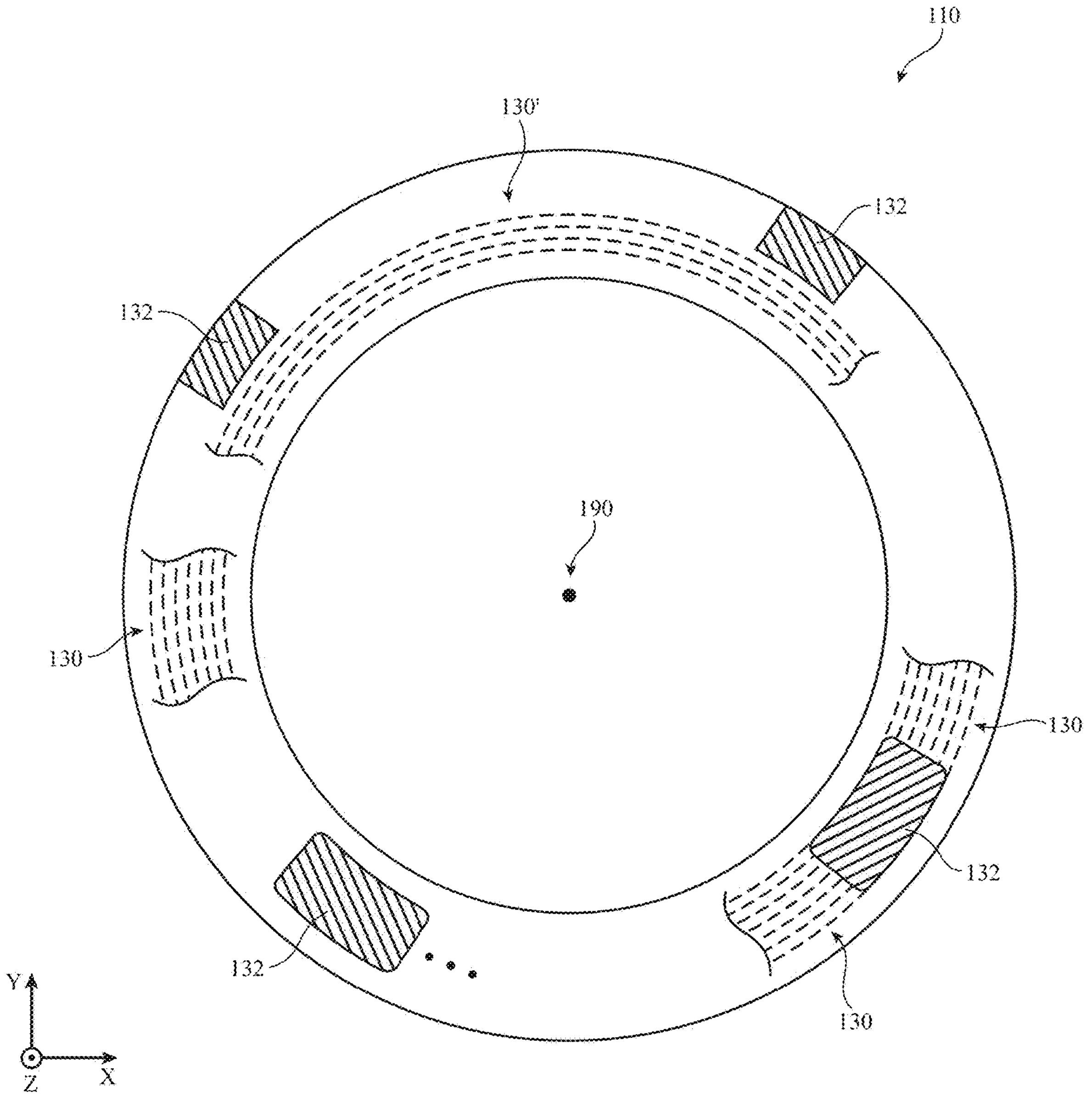
FIG. 6 is a top (plan) view of an illustrative electromagnetic shielding layer having one or more exposed contacts in accordance with some embodiments.

FIG. 6 is a top (plan) view of shielding layer 110 having one or more exposed contacts 132 in accordance with some embodiments. As shown in FIG. 6, shielding layer 110 can include at least four exposed contacts 132 formed along its periphery. The exposed contacts 132 can be shorted to underlying ground traces 130 formed within the flex substrate of layer 110. In some embodiments, at least a portion of the underlying traces 130' can be electrically floating (e.g., traces 130' may not be actively coupled to ground, a power supply voltage, or other bias voltage). Shielding layer 110 may be a circular structure (e.g., having a donut shape) with a center at point 190. This shape is illustrative. Shielding layer 110 can be round, elliptical, or other shape depending on the shape of coil 48.

The four contacts 132 in the example of FIG. 6 may be evenly distributed along the peripheral edge of shielding layer 110 (e.g., the angle between successive contacts 132 from center point 190 may be equal). The example of FIG. 6 in which shielding layer 110 includes four equally spaced ground contacts 132 is illustrative. In general, shielding layer 110 may include two or more equally spaced contacts 132, three or more equally spaced contacts 132, four or more equally spaced contacts 132, four to ten equally spaced contacts 132, 10-20 equally spaced contacts 132, or more than 20 equally spaced contacts 132. Having evenly spaced contacts 132 along the periphery of shielding layer 110 can be technically advantageous and beneficial to each provide more degrees of freedom for grounding magnetic core 114.

Figure 7:
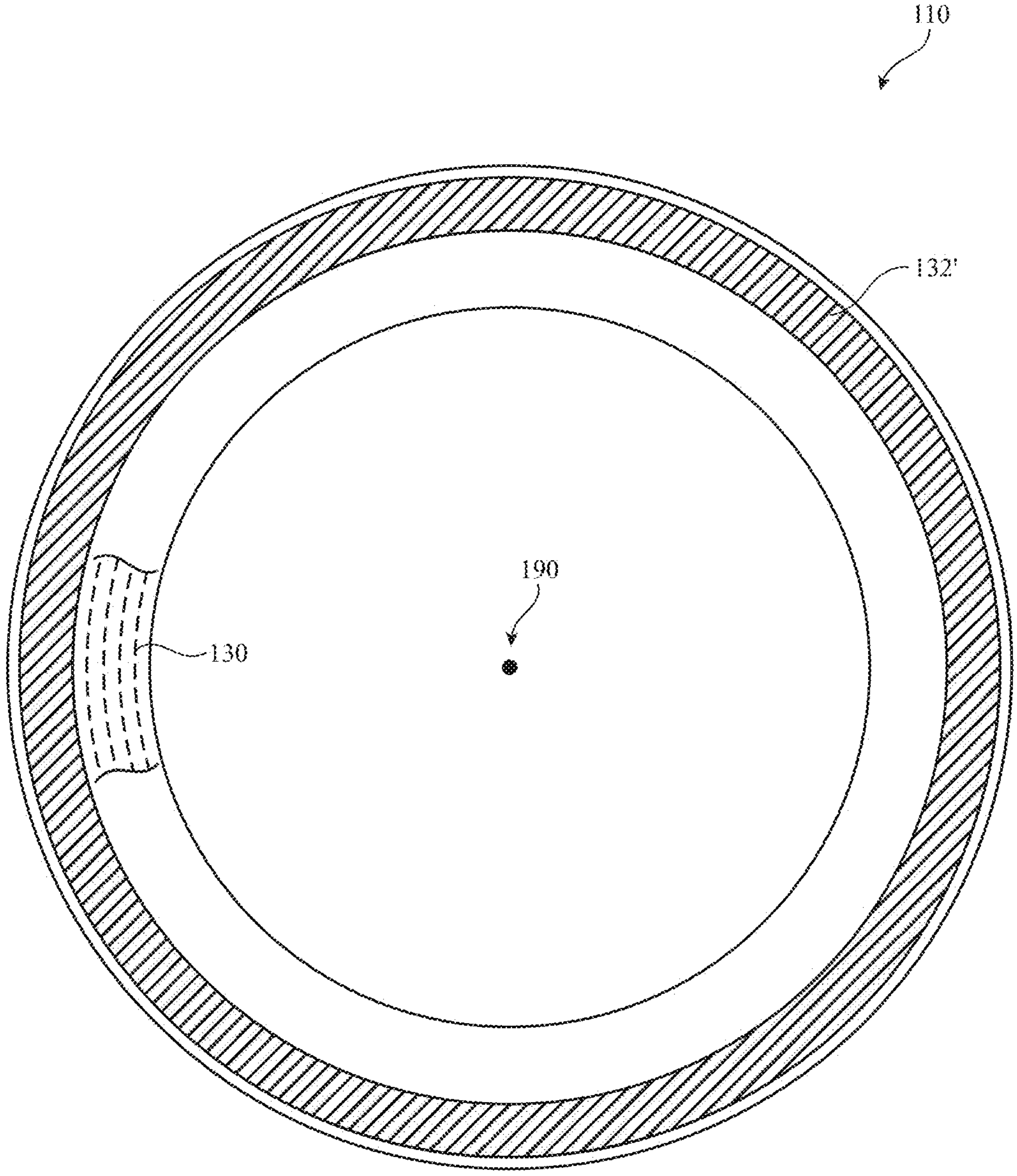
FIG. 7 is top (plan) view of an illustrative electromagnetic shielding layer having an exposed ring-shaped contact in accordance with some embodiments.

The example of FIG. 6 in which shielding layer 110 includes multiple discrete exposed contacts 132 is illustrative. FIG. 7 is top (plan) view of shielding layer 110 having an exposed ring-shaped contact 132' formed along its periphery. The exposed ring-shaped contact 132' can be shorted to underlying ground traces 130 formed within the flex substrate of layer 110. Contact 132' can be referred to as a ring contact or a conductive ring. In embodiments where contact 132' is grounded, contact 132' can be referred to as a ground ring. Implementing contact 132' as a ring can be technically advantageous and beneficial to provide an optimal degree of freedom for grounding magnetic core 114.

Figure 8:
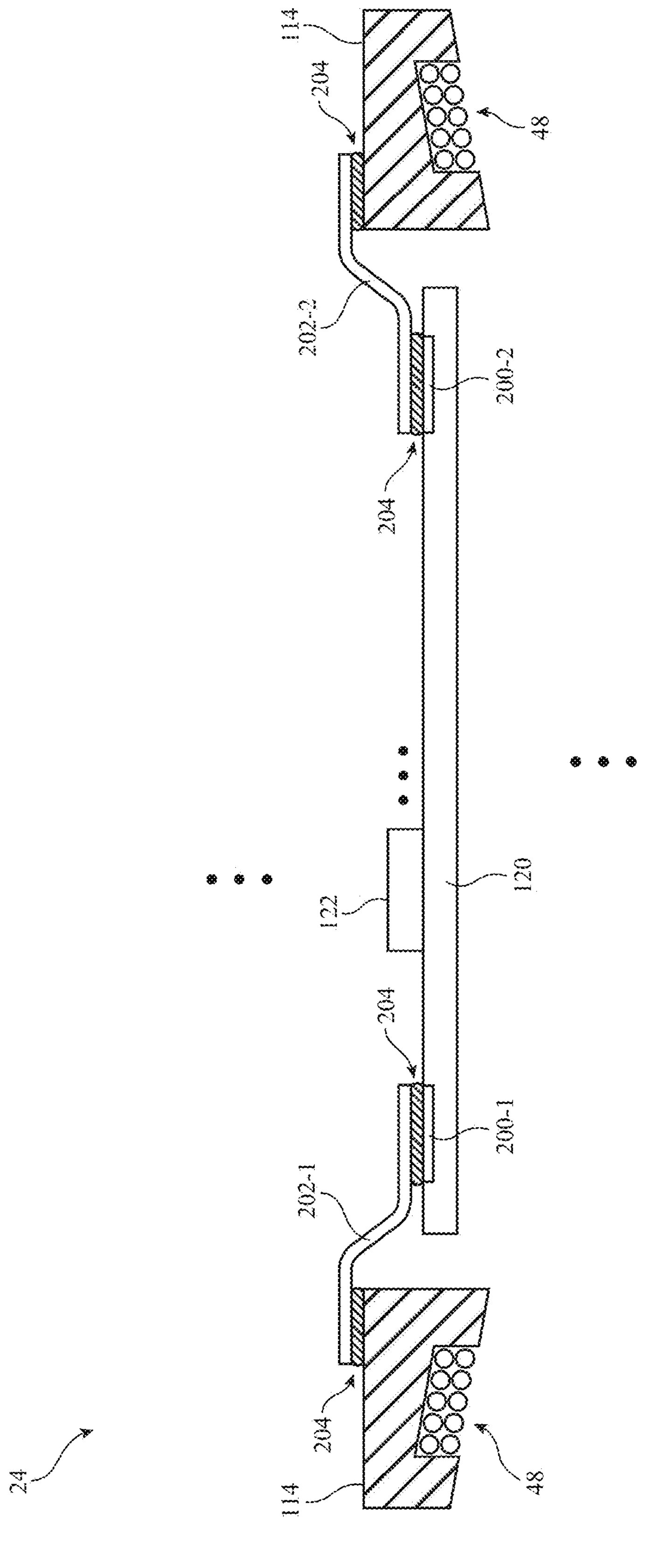
FIG. 8 is a side view of an illustrative power receiving device having a magnetic core electrically coupled to a printed circuit board via a flexible circuit in accordance with some embodiments.

The embodiments described in connection with FIGS. 4-7 in which magnetic core 114 is electrically coupled to one or more exposed contacts of shielding layer 110 are exemplary. In accordance with another embodiment not mutually exclusive with the aforementioned embodiments, magnetic core 114 can be electrically coupled to one or more contacts on printed circuit board 120. FIG. 8 is a side view of power receiving device 24 having magnetic core 114 being electrically coupled to circuit board 120 via a conductive flexible (flex) circuit 202 in accordance with some embodiments. As shown in FIG. 8, a first conductive flex circuit 202-1 may have a first end electrically coupled to a first portion of magnetic core 114 and a second end electrically coupled to an exposed contact 200-1 on circuit board 120. Conductive flex circuit 202-1 may be attached to magnetic core 114 and circuit board 120 via conductive material 204 such as conductive pressure sensitive adhesive or a ferrite bead. For example, the second end of flex circuit 202-1 can be attached to circuit board 120 via a ferrite bead, whereas the first end of flex circuit 202-1 can be attached to magnetic core 114 via conductive adhesive material. In general, other types of electrical connection means can be employed, including but not limited to soldering, welding, clamping, press fitting, and/or other attachment mechanism(s).

Similarly, a second conductive flex circuit 202-2 may have a first end electrically coupled to a second portion of magnetic core 114 and a second end electrically coupled to an exposed contact 200-2 on circuit board 120. Conductive flex circuit 202-2 may be attached to magnetic core 114 and circuit board 120 via conductive material 204 such as conductive pressure sensitive adhesive, a ferrite bead, or other suitable means of electrical connection and attachment. For example, the second end of flex circuit 202-2 can be attached to circuit board 120 via a ferrite bead, whereas the first end of flex circuit 202-2 can be attached to magnetic core 114 via conductive adhesive material. Use of ferrite beads for electrically coupling flex circuits 202 to the contacts on circuit board 120 can be technically advantageous and beneficial to suppress unwanted harmonics that can, if care is not taken, be produced at the junction between the flex circuits and magnetic core 114. Ferrite beads are thus sometimes referred to as ferrite filters or ferrite chokes. Contacts 200-1 and 200-2 can be electrical ground contacts (e.g., electrical contacts coupled to a ground of power receiving device 24). Ground contacts 200-1 and 200-2 can be part of a ground for one or more antennas 58 of device 24. Arranged in this way, conductive flex 202-1 and/or conductive flex 202-2 can sometimes be configured to electrically connect one or more antennas 58 to a ground of device 24. The ground of device 24 can refer to a system ground and/or can be coupled to a DC ground of a power supply of device 24 (e.g., to a DC ground of battery 34). The term "system ground" can refer to a general reference point for device 24, which can include a large conducting body such as a portion of the housing or frame of device 24. The term "antenna ground" can refer to one or more grounding elements of antenna(s) 58.

FIG. 8 shows at least two separate conductive flex circuits 202-1 and 202-2 for electrically coupling magnetic core 114 to corresponding ground contacts 200 on circuit board 120. In general, device 24 may include two or more conductive flex circuits 202, three or more conductive flex circuits 202, or four or more conductive flex circuits 202 for grounding magnetic core 114. Conductive flex circuits 202 can include signal conductors formed from copper, nickel, silver, gold, other metals, conductive polymers, a combination of these materials, or other suitable conductive material. In an example where flex circuits 202 include copper, flex circuits 202 can be referred to as copper flex circuits. This material is exemplary. Grounding magnetic core 114 in this way can be technically advantageous and beneficial to provide a low impedance path for common mode electromagnetic interference and noise signals produced by magnetic core 114 and/or coil 48, thus reducing undesired electromagnetic emission produced by coil 48 device 24 during wireless power transfer operations.

Figure 9:
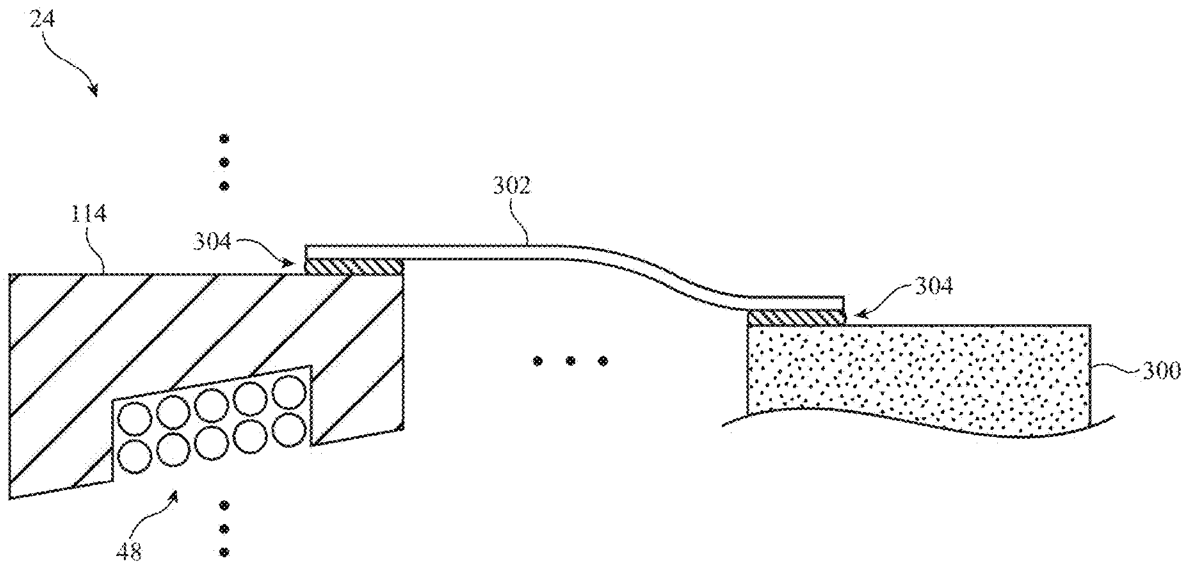
FIG. 9 is a side view of an illustrative power receiving device having a magnetic core electrically coupled to a conductive housing portion of the power receiving device in accordance with some embodiments.

The example of FIG. 8 in which magnetic core 114 is electrically coupled to a contact on circuit board 120 is illustrative. In accordance with another embodiment not mutually exclusive with any of the aforementioned embodiments, FIG. 9 shows a side view of power receiving device 24 having magnetic core 114 being electrically coupled to a device housing portion 300. As shown in FIG. 9, a conductive flex circuit 302 may have a first end electrically coupled to a portion of magnetic core 114 and a second end electrically coupled to housing portion 300. Housing portion 300 may be conductive and may sometimes be referred to as a conductive housing portion. Conductive housing portion 300 may be formed from aluminum, stainless steel, titanium, magnesium, zinc, copper, nickel, conductive polymer, other metals, some combination of these materials, and/or other conductive material(s). Conductive housing portion 300 may serve as a ground of power receiving device 24. For example, conductive housing portion 300 may serve as a ground for one or more antenna system within device 24.

Conductive flex circuit 302 may be attached to magnetic core 114 and conductive housing 300 via conductive material 304 such as conductive pressure sensitive adhesive or a ferrite bead. For example, flex circuit 302 can have a first end electrically coupled to magnetic core 114 via conductive adhesive material and a second end electrically coupled to housing 300 via a ferrite bead. The use of ferrite beads for electrically coupling flex circuit 302 to housing 300 can be technically advantageous and beneficial to suppress unwanted harmonics that can, if care is not taken, be produced at the junction between flex circuit 302 and magnetic core 114. In general, other types of electrical connection means can be employed, including but not limited to soldering, welding, clamping, press fitting, and/or other attachment mechanism(s). FIG. 9 shows at least one conductive flex circuits 302 for electrically coupling magnetic core 114 to conductive housing portion 300. Conductive housing portion 300 can represent a ground of power receiving device 24 (e.g., a housing structure biased to a DC ground voltage) or a ground of one or more antennas within device 24. In general, device 24 may include two or more conductive flex circuits 302, three or more conductive flex circuits 302, or four or more conductive flex circuits 302 for grounding magnetic core 114. Conductive flex circuits 302 can include signal conductors formed from copper, nickel, silver, gold, other metals, conductive polymers, a combination of these materials, or other suitable conductive material. In an example where flex circuits 302 include copper, flex circuits 202 can be referred to as copper flex circuits. This material is exemplary. Grounding magnetic core 114 in this way can be technically advantageous and beneficial to provide a low impedance path for common mode electromagnetic interference and noise signals produced by magnetic core 114 and/or coil 48, thus reducing undesired electromagnetic emission produced by device 24 during wireless power transfer operations.

The use of one or more conductive flex circuits 202 described in connection with FIG. 8 and the use of one or more conductive flex circuits 302 in connection with FIG. 9 for grounding magnetic core 114 are illustrative. In other embodiments, magnetic core 114 can be electrically coupled to a ground on circuit board 120 and/or a housing ground via one or more flexible conductors such as one or more conductive tapes (e.g., copper tapes).

The foregoing is merely illustrative and various modifications can be made to the described embodiments. The foregoing embodiments may be implemented individually or in any combination.

What is claimed is:

1. A power receiving device comprising:

a printed circuit board;

a magnetic structure disposed along a periphery of the printed circuit board, wherein the magnetic structure comprises one or more of ferrite and nanocrystalline alloy sheets;

a wireless power transfer coil disposed on the magnetic structure and configured to receive wireless power from a power transmitting device; and a conductor electrically coupling the magnetic structure to an electrical contact on the printed circuit board and configured to reduce electromagnetic noise produced from the wireless power transfer coil while receiving wireless power from the power transmitting device.

2. The power receiving device of claim 1, wherein the magnetic structure comprises an arcuate structure.

3. The power receiving device of claim 1, wherein the conductor is a flexible circuit having a first end electrically coupled to the magnetic structure via conductive adhesive and a second end electrically coupled to the electrical contact via conductive adhesive or a ferrite bead.

4. The power receiving device of claim 1, wherein the electrical contact comprises a ground contact electrically coupled to a ground of the power receiving device.

5. The power receiving device of claim 1, further comprising:

one or more antennas configured to convey cellular or Wi-Fi signals, wherein the electrical contact is electrically coupled to a ground of the one or more antennas.

6. The power receiving device of claim 1, further comprising:

an additional conductor electrically coupling the magnetic structure to an additional electrical contact on the printed circuit board.

7. The power receiving device of claim 1, further comprising:

one or more light-emitting diodes and one or more light sensors disposed on the printed circuit board.

8. The power receiving device of claim 1, wherein the conductor is a flexible circuit having a first end electrically coupled to the magnetic structure and a second end electrically coupled to the electrical contact via a ferrite bead.

9. A power receiving device comprising:

a housing;

a magnetic structure comprising one or more of ferrite and nanocrystalline alloy sheets;

a wireless power transfer coil disposed on the magnetic structure and configured to receive wireless power from a power transmitting device; and a conductor electrically coupling the magnetic structure to a conductive portion of the housing and configured to reduce electromagnetic noise produced from the wireless power transfer coil while receiving wireless power from the power transmitting device.

10. The power receiving device of claim 9, wherein the magnetic structure comprises an arcuate structure.

11. The power receiving device of claim 9, wherein the conductor is a flexible circuit having a first end electrically coupled to the magnetic structure via conductive adhesive and a second end electrically coupled to the conductive portion of the housing via conductive adhesive or a ferrite bead.

12. The power receiving device of claim 9, wherein the conductive portion of the housing comprises a ground of the power receiving device.

13. The power receiving device of claim 9, further comprising:

one or more antennas configured to convey cellular or Wi-Fi signals, wherein the conductive portion of the house is electrically coupled to a ground of the one or more antennas.

14. A power receiving device comprising:

a magnetic structure comprising one or more of ferrite and nanocrystalline alloy sheets;

a wireless power transfer coil disposed on the magnetic structure and configured to receive wireless power from a power transmitting device; and an electromagnetic shielding layer at least partially overlapping with the magnetic structure and having one or more contacts electrically coupled to the magnetic structure, wherein the electromagnetic shielding layer is configured to reduce electromagnetic noise produced from the wireless power transfer coil while receiving wireless power from the power transmitting device.

15. The power receiving device of claim 14, wherein the electromagnetic shielding layer comprises:

a flexible substrate; and a plurality of conductive traces formed within the flexible substrate and electrically coupled to the one or more contacts.

16. The power receiving device of claim 15, wherein the plurality of conductive traces are electrically coupled to a ground of the power receive device.

17. The power receiving device of claim 14, wherein the magnetic structure is electrically coupled to the one or more contacts via conductive adhesive or conductive spring structures.

18. The power receiving device of claim 14, wherein the one or more contacts comprises a plurality of contacts that are evenly spaced out along a periphery of the electromagnetic shielding layer.

19. The power receiving device of claim 14, wherein the one or more contacts comprise a conductive ring on a surface of the electromagnetic shielding layer.

20. The power receiving device of claim 14, wherein the electromagnetic shielding layer comprises:

a flexible substrate; and a plurality of conductive traces formed within the flexible substrate, wherein at least a first portion of the plurality of conductive traces are coupled to the one or more contacts and wherein a second portion of the plurality of conductive traces are electrically floating.

* * * * *